United States Patent Office

3,404,993
Patented Oct. 8, 1968

3,404,993
HIGH SHEAR DISPERSION OF PIGMENTS
Frederick W. Sanders, Chillicothe, Ohio, assignor to The Mead Corporation, Dayton, Ohio, a corporation of Ohio
No Drawing. Filed May 24, 1966, Ser. No. 552,446
3 Claims. (Cl. 106—308)

ABSTRACT OF THE DISCLOSURE

The present invention relates to preparation of aqueous dispersions of pigments in high shear mixers, using as the dispersing agent vinyl acetate-crotonic acid copolymers containing 3–10%, by weight, of crotonic acid, the dispersion being effected by kneading said pigments while maintaining the pH of the mixture at 6.5–8.5 by means of added water-soluble alkalies.

---

The present invention relates to an improvement in the water dispersion of pigments and particulates of various types. More particularly, it relates to the water dispersion of particulate material in high shear mixers, such as Z-bar type mixers, whereby more uniform dispersions are obtained and the power input required for dispersion is reduced.

It is well known that various types of particulates such as pigments are difficult to disperse with water in high shear mixers, one reason for this being that the particles on being wetted with water become sticky and act like heavy mud and, hence, refuse to "ball" or transfer from blade to blade, with the result that uniform dispersion is not obtained and the power input to the mixer is irregular. The quantity of agglomerates resulting from such dispersion leads to various difficulties, particularly when the dispersions are to be used as coating materials, as in the electrophotographic field. The failure of the coating adhesive to penetrate the agglomerate sufficiently to permit thorough bonding of the particles to each other and to the base results in graininess and powdering of the dried coatings. Lack of uniformity likewise results in poor print reproduction.

It is an object of the present invention to increase efficiency of transfer in high shear mixers.

It is a further object of the present invention to reduce power input required to operate high shear mixers such as Z-bar type mixers used to disperse pigment particulates in water.

It is another object of the present invention to provide a method of obtaining more uniform dispersion of pigment particulates in water.

Other objects will become evident from a reading of the description which follows.

In the past, in preparing coating compositions comprising pigments such as zinc oxide, calcium carbonate, blanc fixe and satin white in the form of aqueous dispersions with various types of adhesives, it has been the custom to first prepare an aqueous dispersion of the pigment in Z-bar type mixers. As pointed out above, this operation has been found difficult and generally unsatisfactory. It has now been found, according to the present invention, that the difficulties previously experienced can be overcome by carrying out the kneading or mixing operation in the presence of approximately 1% by weight (based on pigment content) of a suitable dispersing agent and sufficient alkali to give a pH of approximately 6.5 to 8.5 in the mixer. The use of the added materials produces a more uniform dispersion and at the same time causes a reduction of power input required to operate the mixer and also a more uniform power input to the mixer.

In carrying out the improved dispersion process of the present invention, the dispersing material used was vinyl acetate-crotonic acid copolymer containing about 5% crotonic acid. However, it has been found that the crotonic acid in this material can be varied from 3 to 10%. For certain purposes, it may be desirable to use as the dispersing agent the same material to be subsequently used with the pigment dispersion to form a coating composition.

The dispersing agent may be added to the dispersion in varying amounts, preferably within the range of 0.5 to 3.0% by weight, based on the weight of the pigment being dispersed. While larger or smaller amounts can be used, quite satisfactory results have been obtained using 1% by weight, based on the weight of the pigment. While smaller amounts can be used, the degree of improvement is not as great as with 1%. The use of larger amounts is undesirable unless the same agent is to be used subsequently in the dispersion for producing a coating composition, or for other purposes.

The pH can be maintained in the desired range by incorporation of the necessary amount of various alkaline materials including ammonia, morpholine or alkali or alkaline earth hydroxides. The amount of alkaline material required to give the desired pH will vary, depending upon the acidity of the pigment being dispersed, the particular adhesive used and the like. The alkaline material added serves the purpose of causing the dispersing agent to swell and become cohesive and rubbery, changing the character of the pigment-water mix so that it "balls" or becomes rubbery and non-adherent to the Z-bars and sides of the mixer.

The dispersion operation can be carried out in various ways without affecting materially the desired results. For example, the pigment, dispersing agent and necessary amount of alkaline material can first be dry-blended and the required amount of water then added. Or, the pigment and dispersing agent can first be dry-blended and the alkaline material then added as a solution in water. Or, the alkali can be added, preferably in the form of an aqueous solution, after water has been added to the dry blended mix of pigment and dispersing agent. Upon addition of alkaline material, the dispersing agent begins to swell and dissolve, the mixture going into a tight rubber-like consistency which causes excellent mixing, and renders the power input to the mixer more uniform than when no dispersing agent and alkaline material are used. Likewise, less power consumption is required for the dispersions of equal amounts of pigment.

The specific examples given below will illustrate the operation of the improved dispersion process of the present invention.

Example I 10,000 grams of zinc oxide, 100 grams of vinyl acetate-crotonic acid copolymer containing 5% crotonic acid were dry-mixed in a Z-bar type mixer. After thorough mixing, 4000 ml. of water containing 15 ml. of 28% ammonium hydroxide were added to the mixer and the mixing operation continued. The mixture rapidly achieved a rubbery knead. At the end of 45 minutes mixing, the mix was tested as described below.

Example II

In this experiment, the same amounts of materials and the same operation were followed with the exception that the vinyl acetate-crotonic acid copolymer used in Example I and the alkaline material were omitted. In this case, the mix was a gummy mud which adhered to the walls and the sides of the mixer, giving very poor power transfer.

After mixing for 45 minutes, the mixes resulting from Examples I and II were diluted to 50% solids and 5000 grams of an acrylic resin emulsion added, the pH of the resulting mixture adjusted to 9 with ammonium hydroxide solution, and then 100 grams of shellac previousy dispersed in 385 ml. of water with 15 ml. of 28% ammonium hydroxide added.

Upon coating a glass plate with samples of the above mixes prepared from Examples I and II, it was observed that the sample from Example I in which the dispersion was effected using 1% of vinyl acetate-crotonic acid polymer showed very few agglomerates, whereas the sample from Example II in which no vinyl-acetate-crotonic acid copolymer was used contained a great many agglomerates, thus showing that the coating prepared from the dispersion prepared without use of 1% of dispersion agent was much inferior to that in which the dispersion was effected with it.

Example III

In this experiment, the operation of Example I was repeated with the exception that 200 grams of vinyl acetate-crotonic acid copolymer containing 5% crotonic acid and 30 ml. of 28% ammonium hydroxide were used in place of the amounts employed in Example I. The use of these amounts of additives gave an even tighter knead than that obtained in Example I and there were even fewer aggregates remaining in the final dispersion.

Example IV

In this experiment, the operation of Example I was repeated with the exception that blanc fixe, satin white and finely divided calcium carbonate were substituted in turn for the zinc oxide used in Example I. Improvements similar to those reported above with zinc oxide were obtained in each case.

While particular embodiments of the invention have been described, it will be understood by those skilled in the art that various modifications and/or equivalents may be employed without departing from the invention, and it is intended in the appended claims to cover all such changes and modifications which fall within the true spirit and scope of the invention.

What is claimed is:

1. Method for the preparation of aqueous dispersions of pigments selected from the group consisting of zinc oxide, calcium carbonate, blanc fixe and satin white, which comprises kneading said pigments in a high shear mixer with sufficient water to form a rubbery mix, using as a dispersion agent 0.5–3.0%, by weight (based on the weight of said pigment), of a vinyl acetate-crotonic acid copolymer containing 3–10%, by weight, of crotonic acid, while maintaining the pH of the mixture at 6.5–8.5.

2. The method of claim 1, wherein the pH of the mixture is regulated by the addition of a material selected from the group consisting of ammonia, morpholine, and alkali and alkaline earth hydroxides.

3. Method of claim 1, wherein said dispersing agent contains 5%, by weight, of crotonic acid.

References Cited

FOREIGN PATENTS 717,838 11/1954 Great Britain.
784,662 10/1957 Great Britain.

JAMES E. POER, *Primary Examiner.*